(12) United States Patent
Wang

(10) Patent No.: US 12,073,057 B2
(45) Date of Patent: Aug. 27, 2024

(54) ELECTRONIC DEVICE AND STORAGE MEDIUM FOR OBTAINING, VIA SCREENSHOT COMPARISON, DISPLAY INFORMATION FOR WINDOWS IN BACKGROUND RUNNING STATE

(71) Applicant: VIVO MOBILE COMMUNICATION CO., LTD., Guangdong (CN)

(72) Inventor: Biying Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 152 days.

(21) Appl. No.: 17/956,037

(22) Filed: Sep. 29, 2022

(65) Prior Publication Data

US 2023/0025276 A1    Jan. 26, 2023

Related U.S. Application Data

(63) Continuation of application No. PCT/CN2021/083589, filed on Mar. 29, 2021.

(30) Foreign Application Priority Data

Mar. 30, 2020 (CN) .......................... 202010238779.6

(51) Int. Cl.
*G06F 3/04817* (2022.01)
*G06F 3/04886* (2022.01)

(52) U.S. Cl.
CPC ...... *G06F 3/04817* (2013.01); *G06F 3/04886* (2013.01); *G06F 2203/04804* (2013.01)

(58) Field of Classification Search
None
See application file for complete search history.

(56) References Cited

U.S. PATENT DOCUMENTS

| 2013/0074082 | A1  | 3/2013  | Yu |
| 2013/0080970 | A1* | 3/2013  | Sirpal ...................... G06F 9/44 |
|              |     |         | 715/790 |
| 2014/0237405 | A1  | 8/2014  | Wu |
| 2014/0351744 | A1  | 11/2014 | Jeon et al. |

(Continued)

FOREIGN PATENT DOCUMENTS

| CN | 108037903 A | 5/2018 |
| CN | 109992310 A | 7/2019 |

(Continued)

*Primary Examiner* — Matthew Ell
*Assistant Examiner* — Gabriel Mercado
(74) *Attorney, Agent, or Firm* — Price Heneveld, LLP

(57) ABSTRACT

An information display method, an electronic device, and a storage medium are provided. The method includes: obtaining prompt information of a target application; generating, on a virtual screen, a target window corresponding to a window identifier, and taking a screenshot of the target window to obtain a current window screenshot; in a case that a historical window screenshot of the target window exists and that a difference region exists between the current window screenshot and the historical window screenshot, using the difference region as target display information; in a case that no historical window screenshot of the target window exists, using the current window screenshot as target display information; and displaying the target display information in a target region.

20 Claims, 10 Drawing Sheets

(56) References Cited

U.S. PATENT DOCUMENTS

| | | | |
|---|---|---|---|
| 2015/0160907 A1 | 6/2015 | Zhang et al. | |
| 2015/0350414 A1 | 12/2015 | Park et al. | |
| 2016/0048398 A1* | 2/2016 | Taylor | G06F 9/4881 717/168 |
| 2017/0277391 A1 | 8/2017 | Micheva et al. | |
| 2020/0241746 A1* | 7/2020 | Chen | G06F 3/0482 |

FOREIGN PATENT DOCUMENTS

| | | |
|---|---|---|
| CN | 110018920 A | 7/2019 |
| CN | 110209331 A | 9/2019 |
| CN | 110658961 A | 1/2020 |
| CN | 111459381 A | 7/2020 |
| WO | 2011153786 A1 | 12/2011 |

\* cited by examiner

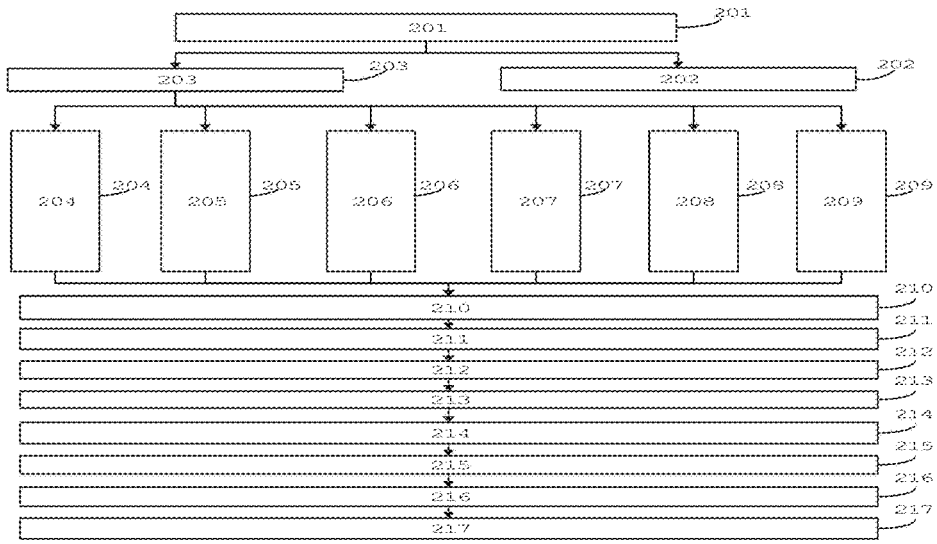

201: Obtain prompt information of a target application, where the target application is in a background running state, and the prompt information includes a window identifier of a target window corresponding to the prompt information 202: In a case that the target application is an encrypted application, display a third prompt mark in an icon display region of the target application 203: Generate, on a virtual screen, the target window corresponding to the window identifier, and take a screenshot of the target window to obtain a current window screenshot 204: In a case that a historical window screenshot of the target window exists, and that a difference region exists between the current window screenshot and the historical window screenshot, and that a size of the difference region is the same as a size of the historical window screenshot, and that a first prompt mark exists in the difference region, use content of a first preset region in the difference region as target display information, where the historical window screenshot is obtained by taking a screenshot of the target window before the target window is switched from a visible state to an invisible state, and the first preset region is a region corresponding to the first prompt mark 205: In a case that a historical window screenshot of the target window exists, and that a difference region exists between the current window screenshot and the historical window screenshot, and that a size of the difference region is the same as a size of the historical window screenshot, and that no first prompt mark exists in the difference region, use content of the difference region as target display information 206: In a case that a historical window screenshot of the target window exists, and that a difference region exists between the current window screenshot and the historical window screenshot, and that a size of the difference region is different from a size of the historical window screenshot, and that no first prompt mark exists in the difference region, use content of the difference region as target display information 207: In a case that a historical window screenshot of the target window exists, and that a difference region exists between the current window screenshot and the historical window screenshot, and that a size of the difference region is different from a size of the historical window screenshot, and that a first prompt mark exists in the difference region, use content of the difference region as target display information 208: In a case that no historical window screenshot of the target window exists and that a second prompt mark exists in the current window screenshot, use content of a second preset region in the current window screenshot as target display information, where the second preset region is a region corresponding to the second prompt mark 209: In a case that no historical window screenshot of the target window exists and that no second prompt mark exists in the current window screenshot, use content of the current window screenshot as target display information 210: In a case that a plurality of pieces of target display information exist, perform differential processing on the plurality of pieces of target display information, and splice the plurality of pieces of target display information after the differential processing, so that the plurality of pieces of target display information are consolidated 211: In the icon display region of the target application, display the consolidated plurality of pieces of target display information in a preset order, where the preset order is related to a target parameter of the target display information 212: Receive a first input by a user 213: Generate a floating window of target transparency in response to the first input 214: Display the target display information by using the floating window, where a display region of the floating window is larger than the icon display region of the target application 215: Close the floating window under a preset condition 216: Receive a fifth input by the user 217: Delete the target display information in response to the fifth input

FIG. 3

ELECTRONIC DEVICE AND STORAGE MEDIUM FOR OBTAINING, VIA SCREENSHOT COMPARISON, DISPLAY INFORMATION FOR WINDOWS IN BACKGROUND RUNNING STATE

CROSS-REFERENCE TO RELATED APPLICATIONS

This application is a continuation application of International Application No. PCT/CN2021/083589 filed on Mar. 29, 2021, which claims priority to Chinese Patent Application No. 202010238779.6, filed with the China National Intellectual Property Administration on Mar. 30, 2020 and entitled "INFORMATION DISPLAY METHOD, ELECTRONIC DEVICE, AND STORAGE MEDIUM", which are incorporated herein by reference in their entireties.

TECHNICAL FIELD

The present invention relates to the field of communications technologies, and in particular, to an information display method, an electronic device, and a storage medium.

BACKGROUND

Portable electronic devices such as mobile phones have become indispensable in people's daily life, and users can obtain a variety of information services by using various applications installed in their electronic devices.

Currently, after a user quits an application running in a foreground of an electronic device of the user or switches the application to background running, the application usually runs an information push function in the background to push various types of simple prompt information to the user. However, if the user wants to learn specific content corresponding to the prompt information, the user needs to start the application for viewing.

Information content of the prompt information is insufficient, and it takes the user a lot of time to start the application to view the content corresponding to the prompt information. Therefore, user experience is reduced.

SUMMARY

Embodiments of the present invention provide an information display method, an electronic device, and a storage medium to resolve a problem in the prior art that information content of prompt information is insufficient and that a user needs to spend time starting an application to view the content.

To resolve the foregoing technical problem, the present invention is implemented as follows:

According to a first aspect, an embodiment of the present invention provides an information display method applied to an electronic device, where the method includes:

obtaining prompt information of a target application, where the target application is in a background running state, and the prompt information includes a window identifier of a target window corresponding to the prompt information;

generating, on a virtual screen, the target window corresponding to the window identifier, and taking a screenshot of the target window to obtain a current window screenshot;

in a case that a historical window screenshot of the target window exists and that a difference region exists between the current window screenshot and the historical window screenshot, using the difference region as target display information, where the historical window screenshot is obtained by taking a screenshot of the target window before the target window is switched from a visible state to an invisible state;

in a case that no historical window screenshot of the target window exists, using the current window screenshot as target display information; and displaying the target display information in a target region.

According to a second aspect, an embodiment of the present invention further provides an electronic device, including:

an obtaining module, configured to obtain prompt information of a target application, where the target application is in a background running state, and the prompt information includes a window identifier of a target window corresponding to the prompt information;

a screenshot module, configured to generate, on a virtual screen, the target window corresponding to the window identifier, and take a screenshot of the target window to obtain a current window screenshot;

a first generation module, configured to: in a case that a historical window screenshot of the target window exists and that a difference region exists between the current window screenshot and the historical window screenshot, use the difference region as target display information, where the historical window screenshot is obtained by taking a screenshot of the target window before the target window is switched from a visible state to an invisible state;

a second generation module, configured to use the current window screenshot as target display information in a case that no historical window screenshot of the target window exists; and a first display module, configured to display the target display information in a target region.

According to a third aspect, an embodiment of the present invention further provides an electronic device, where the electronic device includes a processor, a memory, and a computer program stored in the memory and capable of running on the processor, where when the computer program is executed by the processor, the steps of the information display method in the present invention are implemented.

According to a fourth aspect, an embodiment of the present invention further provides a computer-readable storage medium, where the computer-readable storage medium stores a computer program, and when the computer program is executed by a processor, the steps of the foregoing information display method are implemented.

According to the information display method, electronic device, and storage medium provided in the embodiments of the present invention, the target window of the target application corresponding to the received prompt information is opened by using the virtual screen, and the screenshot is taken; and content of the target window is displayed in the target region to a user based on a comparison between the current window screenshot and the historical window screenshot of the target window. Therefore, the user can quickly and comprehensively view the content corresponding to the prompt information without spending a lot of time starting the target window of the target application, and user experience is improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a flowchart of steps of another information display method according to an embodiment of the present invention;

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that "one embodiment" or "an embodiment" mentioned throughout this specification means that specific features, structures, or characteristics related to the embodiment are included in at least one embodiment of the present invention. Therefore, "in one embodiment" or "in an embodiment" that appears throughout this specification does not necessarily refer to the same embodiment. In addition, the specific features, structures, or characteristics may be combined in any appropriate manner in one or more embodiments.

It should be understood that sequence numbers of processes in various embodiments of the present invention do not mean execution sequences. The execution sequences of the processes should be determined based on functions and internal logic of the processes, and should not be construed as any limitation on implementation processes of the embodiments of the present invention.

Figure 1:
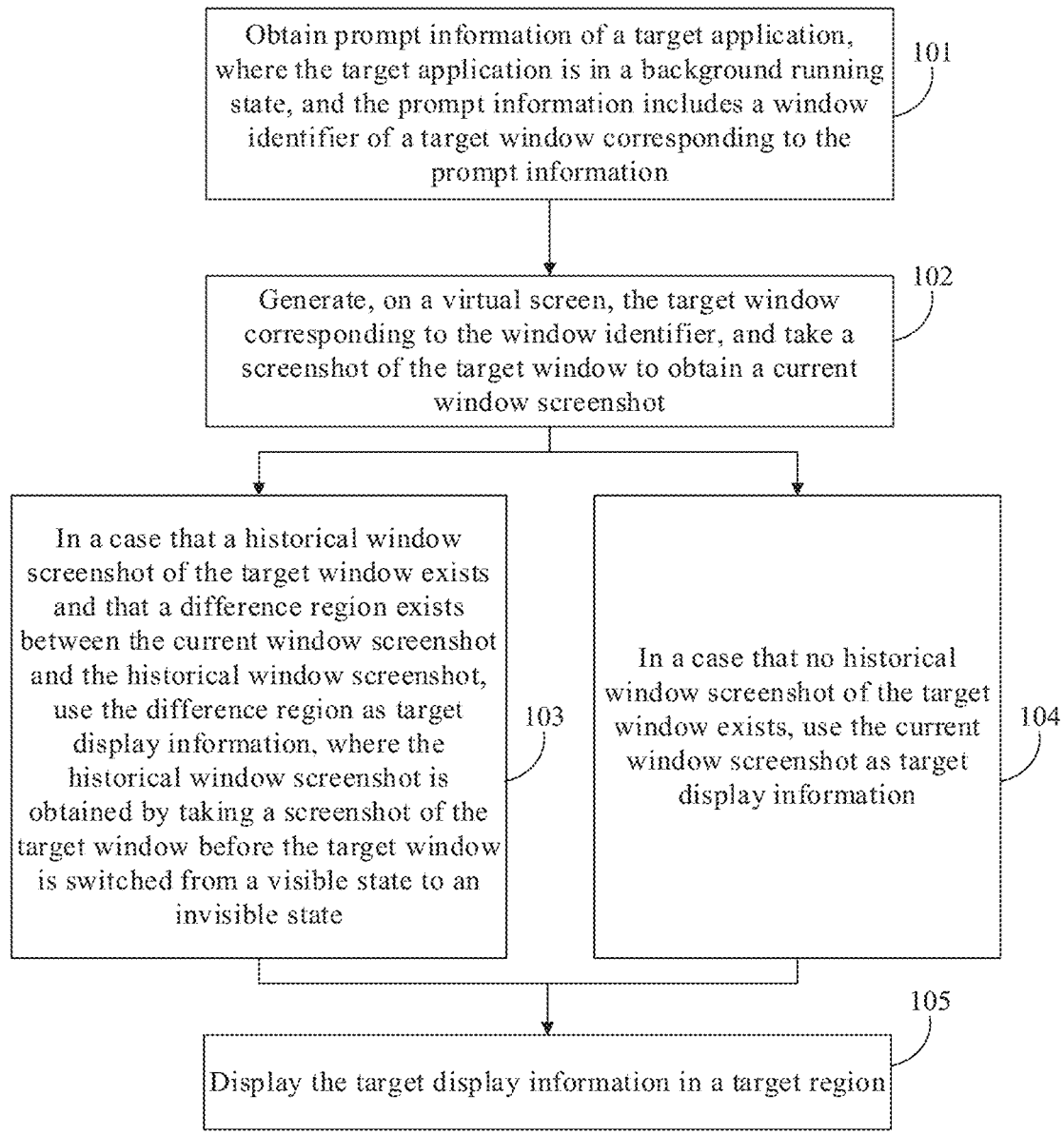
FIG. 1 is a flowchart of steps of an information display method according to an embodiment of the present invention.

Referring to FIG. 1, an embodiment of the present invention provides an information display method applied to an electronic device. The method includes the following steps.

Step 101: Obtain prompt information of a target application, where the target application is in a background running state, and the prompt information includes a window identifier of a target window corresponding to the prompt information.

In this embodiment of the present invention, the prompt information of the target application is prompt information pushed in a foreground by the target application running in the background of the electronic device. In other words, usually, after the target application in the electronic device is switched from foreground running to background running, an information prompting process still runs in the background, so that when new information is received, corresponding prompt information is pushed through the foreground, where the prompt information is used to notify a user of viewing corresponding content and briefly describe the content. The target application is an application that still pushes prompt information during background running in the electronic device. For example, when receiving new chat content, a social application pushes prompt information briefly describing the chat content through the foreground. The window identifier is used to locate an application window in which the content corresponding to the prompt information is located.

Usually, the user can trigger the target application to switch to foreground running by tapping the prompt information provided by the target application, and open, based on the window identifier, the target window for displaying the content corresponding to the prompt information, so that the user views the content.

Step 102: Generate, on a virtual screen, the target window corresponding to the window identifier, and take a screenshot of the target window to obtain a current window screenshot.

In this embodiment of the present invention, the virtual screen is a display screen whose display region is located outside a display region of a physical screen and has a same size as the display region of the physical screen. The virtual screen is invisible to the user and does not affect a display effect of the physical screen. For example, if a coordinate range of the display region of the physical screen is (0, 0) to (1080, 1920), a coordinate range of the display region of the virtual screen may be (1090, 0) to (2170, 1920), (0, 1930) to (1080, 3840), or the like.

The target application corresponding to the window identifier is started by generating the virtual screen that does not affect the effect of the physical screen. In addition, based on a startup sequence of display windows, the target application is enabled to generate the target window corresponding to the window identifier, and a screenshot of the target window is taken. It may be understood that, generally, after the application in the electronic device is switched to background running, a main function process is basically completely closed, and only information prompting is enabled. In this case, if the target window of the target application needs to be opened, it is necessary to open windows one by one starting from a startup window to the target window. Windows other than the target window among the windows started sequentially in a cold start process, such as a main interface window, and an advertisement window, are useless to the user and consume some time. If the target window is opened directly through the physical screen, the user needs to browse a lot of useless information and wait for the windows to be opened sequentially. This wastes a lot of time and affects user experience. Therefore, opening the target window in a form of a virtual screen is a manner that the user cannot perceive and that does not require the user to spend a lot of time waiting. Therefore, user experience can be improved.

Step 103: In a case that a historical window screenshot of the target window exists and that a difference region exists between the current window screenshot and the historical window screenshot, use the difference region as target display information, where the historical window screenshot is obtained by taking a screenshot of the target window before the target window is switched from a visible state to an invisible state.

In this embodiment of the present invention, the historical window screenshot is a screenshot of the content in the target window, taken and stored when the user switches the target window from the visible state to the invisible state last time. The visible state means that the target window is in a foreground running state, so that the user can browse through the physical screen. The invisible state means that the target window is in the background running state or a closed state, so that the target window is invisible to the user on the physical screen.

It may be understood that when the target window is switched from the visible state to the invisible state, current content in the target window has been browsed by the user and does not need to be displayed to the user again. If the content in the target window changes when the target window is in the invisible state, that is, if a difference region exists, content of the difference region needs to be displayed to the user, so that the user can obtain the changed content in the target window more efficiently. Specifically, the current window screenshot of the target window is compared with the historical window screenshot to obtain content of the difference region, and corresponding target display information is generated based on the content for displaying to the user.

Figure 2:
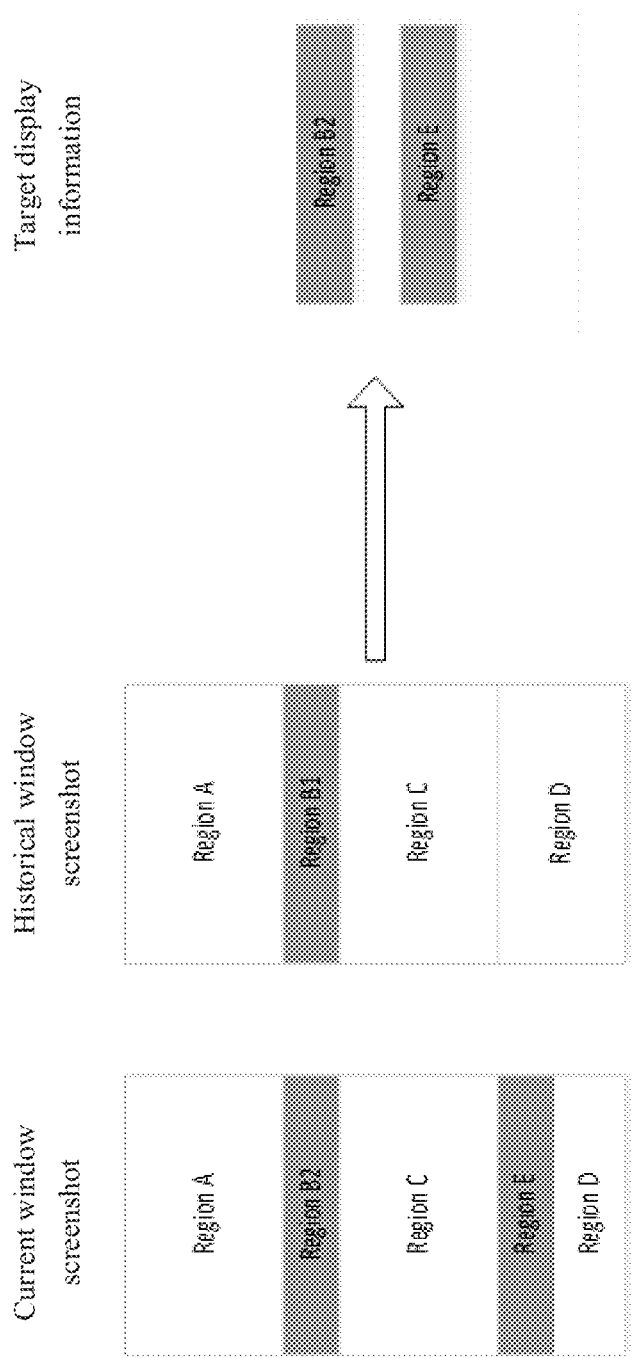
FIG. 2 is a schematic diagram showing an effect of a first method for obtaining target display information according to an embodiment of the present invention.

For example, referring to FIG. 2, difference regions between the current window screenshot and the historical window screenshot are a region B2 and a region E, and content of the regions in which the region B2 and the region E are located is used as target display information.

Step 104: In a case that no historical window screenshot of the target window exists, use the current window screenshot as target display information.

In this embodiment of the present invention, if the target window corresponding to the prompt information was not opened on the physical screen previously, no historical window screenshot of the target window can be obtained. The target window was not opened previously for browsing by the user, the content in the target window is completely new to the user, and there is no duplication with content previously viewed by the user. Therefore, the target display information can be generated directly based on the content in the current window screenshot for displaying to the user.

Step 105: Display the target display information in a target region.

In this embodiment of the present invention, to display the target display information to the user without affecting normal use of the electronic device by the user, the target region may be used to display the information of the target display information. The target region may be an idle region of the display screen; or may be a display window at a higher level than an original display window of the display screen, where the display window at the higher level is generated when the target display information is displayed; or may be an original display region on the display screen, where content in the original display region is replaced with the target display information. The target display region may be specifically preset by a system, or may be set by the user based on an actual requirement of the user, as long as the user can conveniently view the target display information. This is not specifically limited in this embodiment of the present invention.

According to the information display method provided in this embodiment of the present invention, the target window of the target application corresponding to the received prompt information is opened by using the virtual screen, and the screenshot is taken; and content of the target window is displayed in the target region to the user based on a comparison between the current window screenshot and the historical window screenshot of the target window. Therefore, the user can quickly and comprehensively view the content corresponding to the prompt information without spending a lot of time starting the target window of the target application, and user experience is improved.

Referring to FIG. 3, an embodiment of the present invention provides another information display method, applied to an electronic device. The method includes the following steps.

Step 201: Obtain prompt information of a target application, where the target application is in a background running state, and the prompt information includes a window identifier of a target window corresponding to the prompt information.

For this step, refer to the detailed description of step 101. Details are not described herein again.

Step 202: In a case that the target application is an encrypted application, display a third prompt mark in an icon display region of the target application.

In this embodiment of the present invention, the encrypted application is an application that exists in an encrypted application list set by a user. The encrypted application usually involves user privacy, or the user does not want to browse content of the target window in a case that the user does not enter the target window of the target application. Therefore, for the prompt information received by the target application, content involved in the prompt information is not displayed to the user, but the third prompt mark is added to the icon display region of the target application to prompt the user that there is new information content in the target application, and notify the user in time while protecting privacy of the user. The third prompt mark may be a view mark of a preset style, such as a red dot style, a speech bubble style, or an envelope style. The preset style of the third prompt mark may be preset by a system, or may be set by the user based on an actual requirement of the user. This is not specifically limited in this embodiment of the present invention.

Step 203: Generate, on a virtual screen, the target window corresponding to the window identifier, and take a screenshot of the target window to obtain a current window screenshot.

For this step, refer to the detailed description of step 102. Details are not described herein again.

Step 204: In a case that a historical window screenshot of the target window exists, and that a difference region exists between the current window screenshot and the historical window screenshot, and that a size of the difference region is the same as a size of the historical window screenshot, and that a first prompt mark exists in the difference region, use content of a first preset region in the difference region as target display information, where the historical window screenshot is obtained by taking a screenshot of the target window before the target window is switched from a visible state to an invisible state, and the first preset region is a region corresponding to the first prompt mark.

In this embodiment of the present invention, the first prompt mark is a prompt mark of the target window of the target application for a dialog box containing new information. If content of the current window screenshot and content of the historical window screenshot are completely different, the difference region includes all the content of the current window screenshot. Because the current window screenshot and the historical window screenshot belong to the same target window, the size of the current window screenshot is the same as the size of the historical window screenshot. In a case that the difference region includes all the content of the current window screenshot, the size of the difference region in the current window screenshot is the same as the size of the historical window screenshot. To improve validity of the displayed content, the content included in the first preset region corresponding to the first prompt mark is usually used as the target display information. The first prompt mark may be a prompt mark such as a bubble or a red dot that will be added around the dialog box in the application to notify the user that information in the dialog box has not been browsed. The first preset region is a region in which the content corresponding to the first prompt mark in the application is located.

Figure 4:
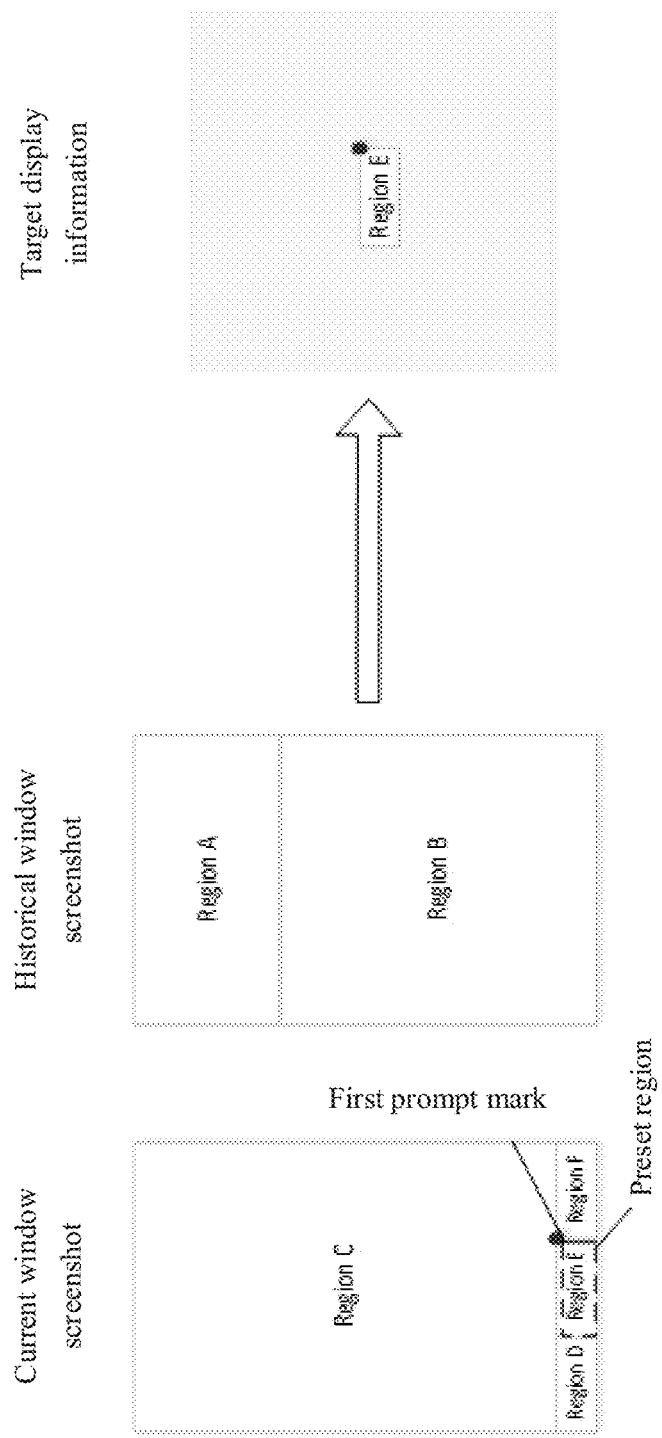
FIG. 4 is a schematic diagram showing an effect of a second method for obtaining target display information according to an embodiment of the present invention.

For example, referring to FIG. 4, the current window screenshot includes a region C, a region D, a region E, and a region F, and the historical window screenshot includes a region A and a region B. Therefore, the content of the current window screenshot and the content of the historical window screenshot are completely different, and the difference region includes all the content region C, region D, region E, and region F in the current window screenshot. Because the current window screenshot and the historical window screenshot belong to the same target window, the size of the difference region in the current window screenshot is completely the same as the size of the historical window screenshot, and the first prompt mark in a form of a dot exists in the current window screenshot. In this case, the content included in the first preset region region E corresponding to the first prompt mark is used as the target display information.

Step 205: In a case that a historical window screenshot of the target window exists, and that a difference region exists between the current window screenshot and the historical window screenshot, and that a size of the difference region is the same as a size of the historical window screenshot, and that no first prompt mark exists in the difference region, use content of the difference region as target display information.

In this embodiment of the present invention, in a case that the size of the difference region in the current window screenshot is the same as the size of the historical window screenshot and that no first prompt mark exists in the difference region, it indicates that the content of the difference region is all content of the current window screenshot. In this case, the content of the difference region may be directly used as the target display information.

Figure 5:
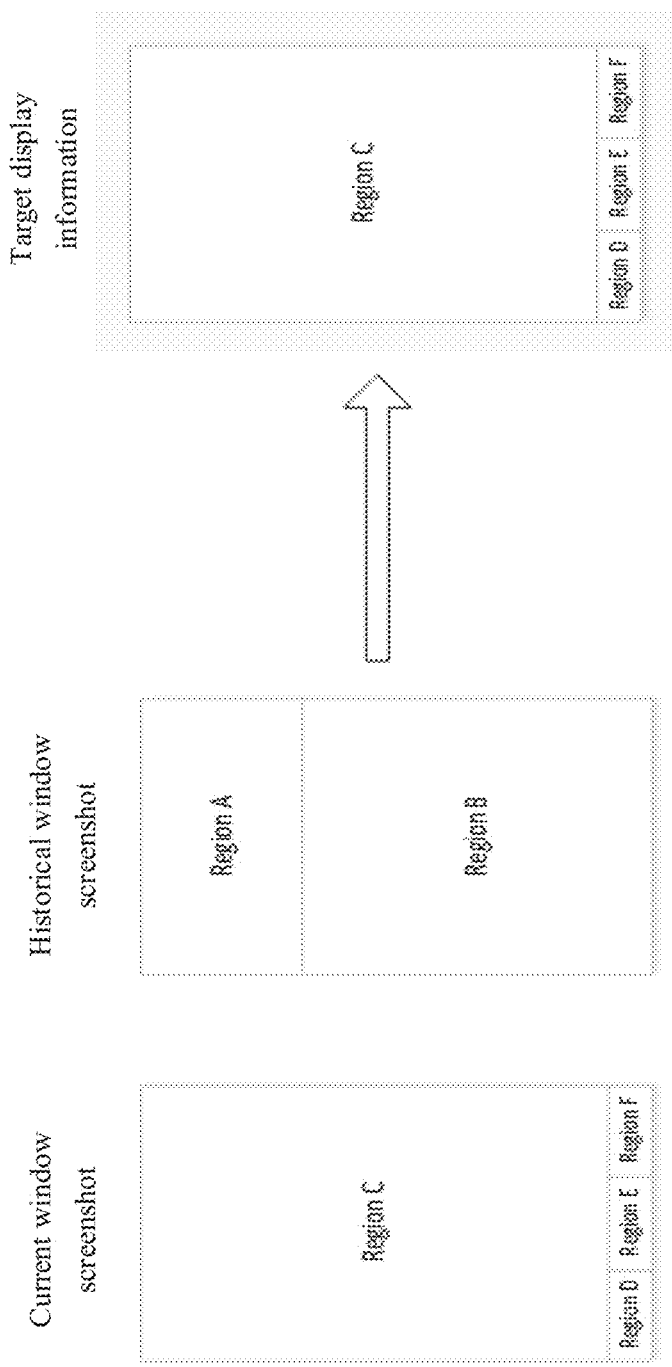
FIG. 5 is a schematic diagram showing an effect of a third method for obtaining target display information according to an embodiment of the present invention.

For example, referring to FIG. 5, the current window screenshot includes a region C, a region D, a region E, and a region F, and the historical window screenshot includes a region A and a region B. Therefore, the content of the current window screenshot and content of the historical window screenshot are completely different, and the difference region includes all the content region C, region D, region E, and region F in the current window screenshot. Because the current window screenshot and the historical window screenshot belong to the same target window, the size of the difference region in the current window screenshot is completely the same as the size of the historical window screenshot. In addition, in a case that there is no first prompt mark in the current window screenshot, all the content of the current window screenshot, that is, the region C, region D, region E, and region F, is used as the target display information.

Step 206: In a case that a historical window screenshot of the target window exists, and that a difference region exists between the current window screenshot and the historical window screenshot, and that a size of the difference region is different from a size of the historical window screenshot, and that no first prompt mark exists in the difference region, use content of the difference region as target display information.

In this embodiment of the present invention, if the size of the difference region in the current window screenshot is different from the size of the historical window screenshot, it indicates that all the content of the difference region in the current window screenshot is new content, and other content is duplicate content. In this case, the content of the difference region is used as the target display information.

Step 207: In a case that a historical window screenshot of the target window exists, and that a difference region exists between the current window screenshot and the historical window screenshot, and that a size of the difference region is different from a size of the historical window screenshot, and that a first prompt mark exists in the difference region, use content of the difference region as target display information.

In this embodiment of the present invention, if the size of the difference region in the current window screenshot is different from the size of the historical window screenshot, it indicates that all the content of the difference region in the current window screenshot is new content. Although the first prompt mark exists in the difference region, content of other parts still has new content in comparison with the historical window screenshot. Therefore, the content of the difference region is also used as the target display information.

Step 208: In a case that no historical window screenshot of the target window exists and that a second prompt mark exists in the current window screenshot, use content of a second preset region in the current window screenshot as target display information, where the second preset region is a region corresponding to the second prompt mark.

In this embodiment of the present invention, the second prompt mark is similar to the first prompt mark in step 204, and the second preset region is similar to the first preset region in step 204. To avoid repetition, details are not described herein again. If the target window of the target application was not opened previously, and no screenshot of the target window of the target application could be taken previously, no historical window screenshot of the target window exists. In this case, to improve validity of content in the current window screenshot, the content of the preset region corresponding to the second prompt mark in the current window screenshot may be used as the target display information.

Step 209: In a case that no historical window screenshot of the target window exists and that no second prompt mark exists in the current window screenshot, use content of the current window screenshot as target display information.

In this embodiment of the present invention, if no historical window screenshot of the target window exists and no second prompt mark exists in the current window screenshot, no reference basis can be found. Therefore, content of the current window is directly used as the target display information.

Step 210: In a case that a plurality of pieces of target display information exist, perform differential processing on the plurality of pieces of target display information, and splice the plurality of pieces of target display information after the differential processing, so that the plurality of pieces of target display information are consolidated.

In this embodiment of the present invention, if content corresponding to the prompt information exists in a plurality of target windows for the same target application, differential processing may be performed on target display information corresponding to the plurality of target windows in a preset manner, so that the user can distinguish the target display information. Specifically, the preset manner may be: marking, based on different background colors, the target display information corresponding to the plurality of target windows, or using different borders for the target display information, or setting different fonts for content of a content text in the target display information, or the like. Further, the plurality of pieces of target display information after the differential processing may be arranged and consolidated in a preset order, so that the user can browse content of the plurality of target windows in the same target application at the same time. Certainly, the plurality of pieces of target display information may alternatively be arranged in other manners based on an actual requirement, as long as the solution can be implemented. This is not limited herein.

Figure 6:
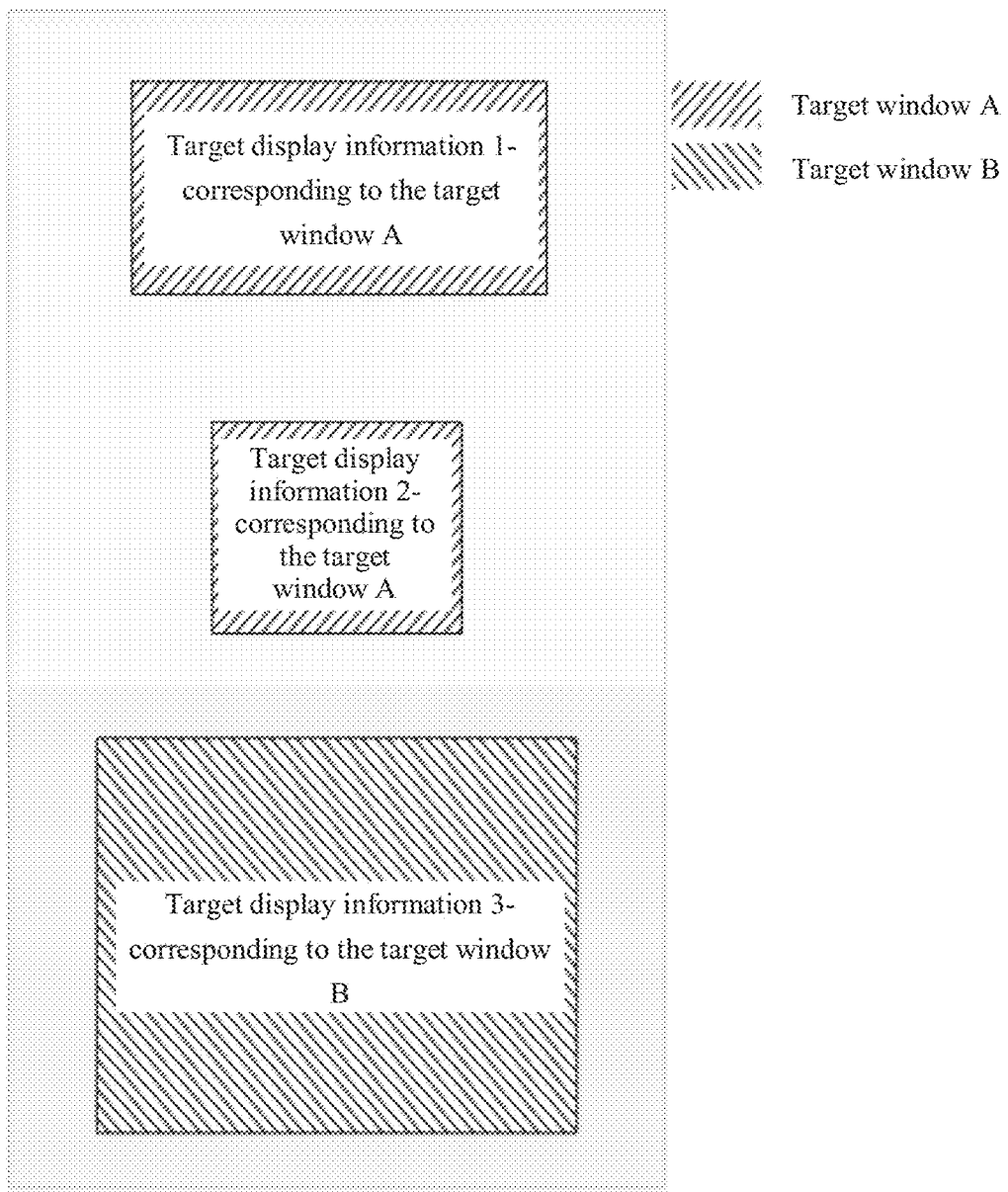
FIG. 6 is a schematic diagram showing an effect of a method for displaying target display information according to an embodiment of the present invention.

For example, referring to FIG. 6, target display information 1 and target display information 2 corresponding to a target window A of the target application are marked in one background color, then target display information 3 corresponding to a target window B of the target application is marked in another background color, and then the target display information is combined in an order. For example, the target display information of the same target window, that is, the same background color, is arranged adjacently to each other. In this way, consolidated target display information including content corresponding to all prompt information of the target application is obtained.

Step 211: In the icon display region of the target application, display the consolidated plurality of pieces of target display information in a preset order, where the preset order is related to a target parameter of the target display information.

In this embodiment of the present invention, the target parameter may refer to a priority of the target display information. Target display information with a high priority may be displayed before target display information with a low priority, so that the user will not miss important information. Alternatively, the target parameter may be a type of target window corresponding to the target display information, and target display information corresponding to target windows of the same type is arranged and displayed adjacently. Alternatively, the target parameter may be a generation time of the target display information, and the target display information is displayed in order of the generation time. Alternatively, the target parameter may be a background color of the target display information, and the target display information in the same background color is arranged and displayed adjacently. Certainly, this embodiment of the present invention is only illustrative, and the target parameter may be specifically preset by the system based on an actual requirement, or may be set by the user based on a requirement of the user. This is not specifically limited herein.

If the target application is placed in a folder, the target display information can be viewed through the icon display region only after the user taps to magnify the folder or taps to enter the folder. In this way, the content of the target window corresponding to the prompt information can be comprehensively displayed to the user without excessively occupying a display region of a physical screen.

Optionally, step 211 includes: dynamically displaying the target display information in the icon display region of the target application.

In this embodiment of the present invention, a size of the icon display region on the physical screen is limited, and it is impossible to display all the target display information clearly and simultaneously. Therefore, the consolidated target display information can be scrolled for displaying in the icon display region based on a preset period. For example, with 2 s as a period, application icon content is displayed for 1 s, and the target display information is dynamically magnified or minified for displaying for 1 s. This is periodically cycled to implement dynamic displaying of the target display information, thereby improving flexibility of displaying the content corresponding to the prompt information in the target application.

Step 212: Receive a first input by the user.

In this embodiment of the present invention, the first input may be an operation such as a tap, a touch and hold, or a slide by the user on the target display information displayed on the physical screen, or a preset pressing operation on a physical key of the electronic device. Specifically, the first input may be determined based on an actual requirement and is not specifically limited herein.

Step 213: Generate a floating window of target transparency in response to the first input.

In this embodiment of the present invention, the floating window is a semi-transparent window drawn in a form of a floating layer in a screen display region of the physical screen. The target transparency may be preset based on an actual requirement. Low transparency can enable the user to recognize the target display information in the floating window more easily. Thanks to high transparency, the floating window can have little impact on other display content in a display region covered by the floating window. In other words, transparency is inversely proportional to recognizability of the target display information in the floating window. In an actual application, the target transparency may be set to 50%, so that the user can clearly view the target display information in the floating window without affecting the display content of the region covered by the floating window. The target transparency may be preset by the system, or may be set by the user based on a requirement of the user. This is not specifically limited herein.

Step 214: Display the target display information by using the floating window, where a display region of the floating window is larger than the icon display region of the target application.

In this embodiment of the present invention, if the user feels that the target display information displayed in the icon display region is excessively small, the floating window containing the target display information can be generated by performing the first input on the target display information or the target application to magnify the target display information for displaying. The displayed floating window is larger than the icon display region in size, and can display more target display information. However, when there is excessive target display information, the floating window may not be able to display all the target display information at the same time. Therefore, the user may further perform a slide operation on the floating window to scroll up and down to change the target display information displayed in the floating window, thereby conveniently viewing all the target display information.

Figure 7:
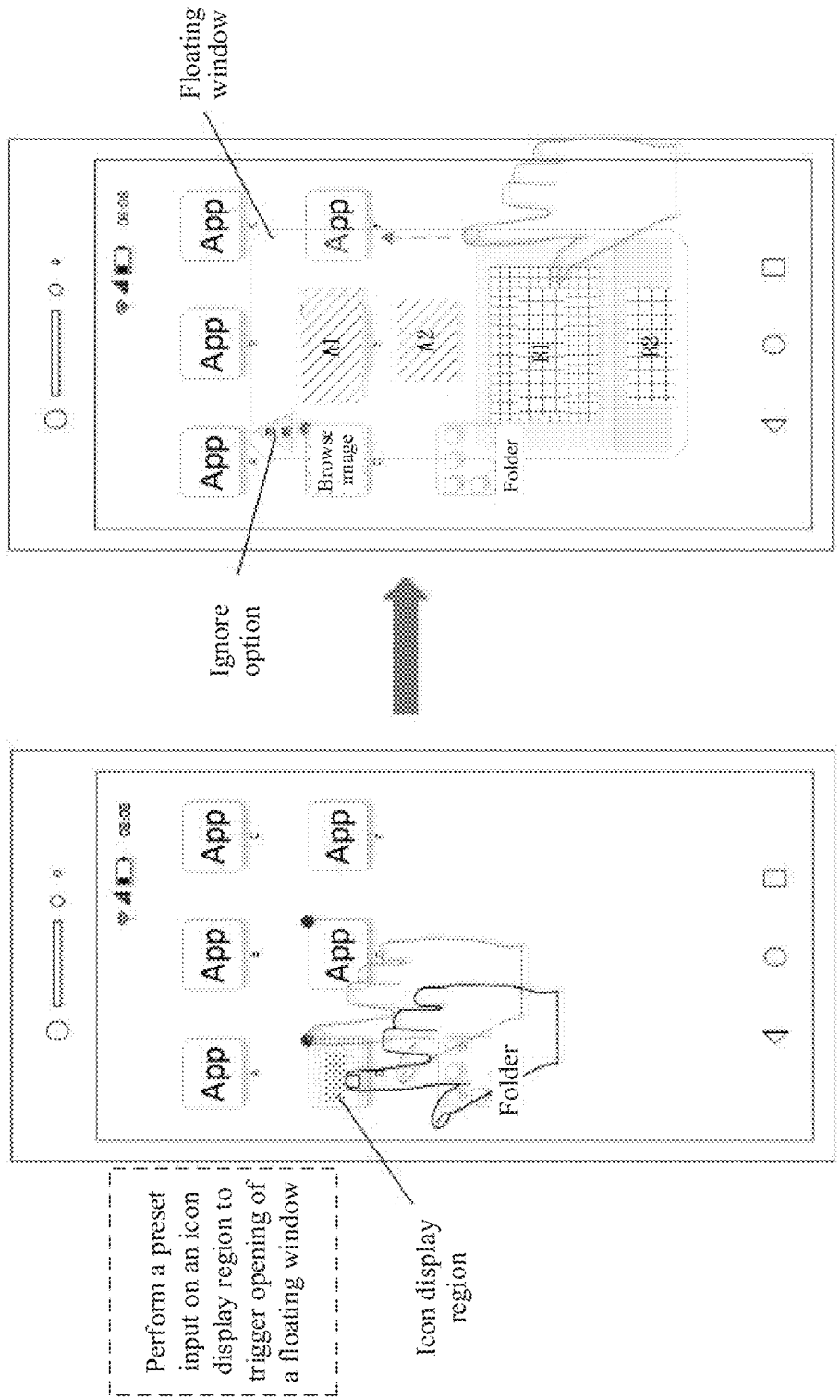
FIG. 7 is a schematic diagram showing an effect of a method for opening a floating window according to an embodiment of the present invention.

In an actual application, referring to FIG. 7, a browse image is a display image of the target display information. The user can tap a dot mark in the icon display region to trigger opening of the floating window corresponding to the target display region to magnify the target display information for displaying. Target display information A1 and target display information A2 displayed in a slash background color in the floating window belong to a target application A; and target display information B1 and target display information B2 displayed in a block background color belong to a target application B, so that the user can distinguish, based on the background color, the application to which the target display information belongs. By performing a tap input on an ignore option in FIG. 7, the user can trigger the electronic device to delete the target display information, no longer display the browse image in the icon display region, and clear the dot mark.

Step 215: Close the floating window under a preset condition.

The preset condition includes at least one of the following S1 to S3.

S1. No second input by the user to the floating window is detected in a preset display time period.

In this embodiment of the present invention, the second input is similar to the first input in step 212. To avoid repetition, details are not described herein again. If the user does not perform the second input on the floating window within a preset display time, such as 5 seconds, it is determined that the user has finished browsing the target display information, and the floating window can be automatically closed.

S2. A third input by the user to the floating window is detected.

In this embodiment of the present invention, the third input is similar to the first input in step 212. To avoid repetition, details are not described herein again. The user can also perform the third input such as a touch and hold input on the floating window to trigger closing of the floating window and also delete the target display information at the same time.

S3. A fourth input by the user to a display region other than the display region of the floating window on the physical screen is detected.

In this embodiment of the present invention, the fourth input is similar to the first input in step 212. To avoid repetition, details are not described herein again. The user can further trigger closing of the target display information by performing the fourth input on the display region other than the floating window on the physical screen. It may be understood that if the user needs to perform an operation in the other display region on the physical screen, the floating window can be quickly closed and the other region can be touched in this manner.

Step 216: Receive a fifth input by the user.

In this embodiment of the present invention, the fifth input is similar to the first input in step 212. To avoid repetition, details are not described herein again.

Step 217: Delete the target display information in response to the fifth input.

Figure 8:
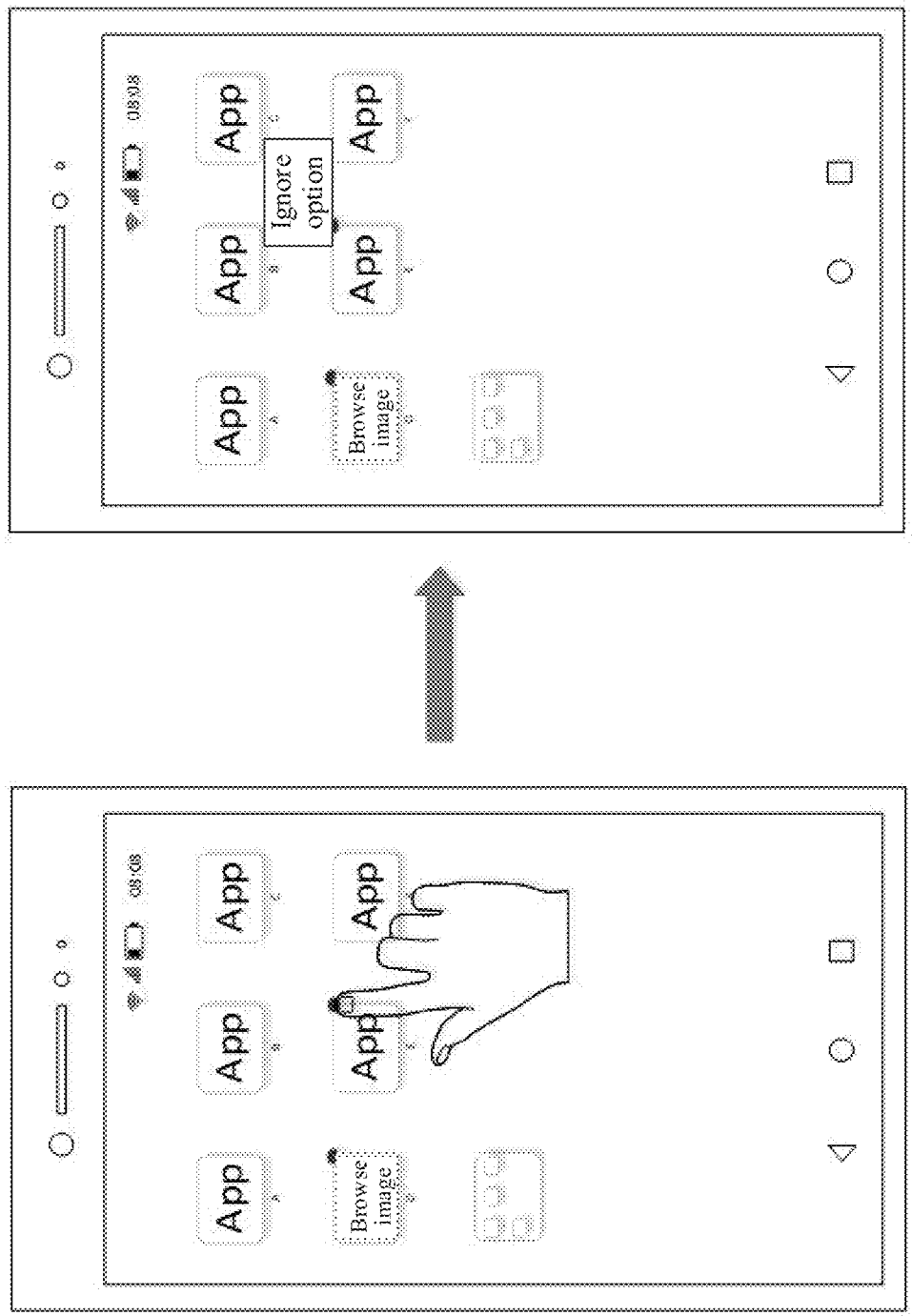
FIG. 8 is a schematic diagram showing an effect of a method for closing a floating window according to an embodiment of the present invention.

In this embodiment of the present invention, referring to FIG. 8, the browse image is the display image of the target display information, and the fifth input may be that the user taps the dot in the icon display region to trigger displaying of the ignore option. The user can perform the fifth input on the ignore option to close the floating window corresponding to the icon display region and/or clear target display information from a memory.

Certainly, referring to FIG. 8, if there is no target display information in the icon display region, but only the dot, the user can perform the fifth input on the dot, for example, a tap or slide operation, to eliminate the red dot and ignore the dot prompt.

It should be noted that the foregoing manner of closing the floating window is only an exemplary description of the present invention, and the foregoing functions may alternatively be implemented in other manners, subject to the implementation of the solution. A specific preset condition is not limited herein.

According to the another information display method provided in this embodiment of the present invention, the target window of the target application corresponding to the received prompt information is opened by using the virtual screen, and the screenshot is taken; and content of the target window is displayed in the target region to the user based on a comparison between the current window screenshot and the historical window screenshot of the target window. Therefore, the user can quickly and comprehensively view the content corresponding to the prompt information without spending a lot of time starting the target window of the target application, and user experience is improved. In addition, by setting the consolidated plurality of pieces of target display information for dynamic displaying, efficiency of browsing the content in the target window by the user is improved, and by setting the floating window to magnify the target display information for displaying, flexibility of displaying the target display information is improved.

The information display methods provided in the embodiments of the present invention have been described above. With reference to an accompanying drawing, the following describes an electronic device provided in an embodiment of the present invention.

Figure 9:
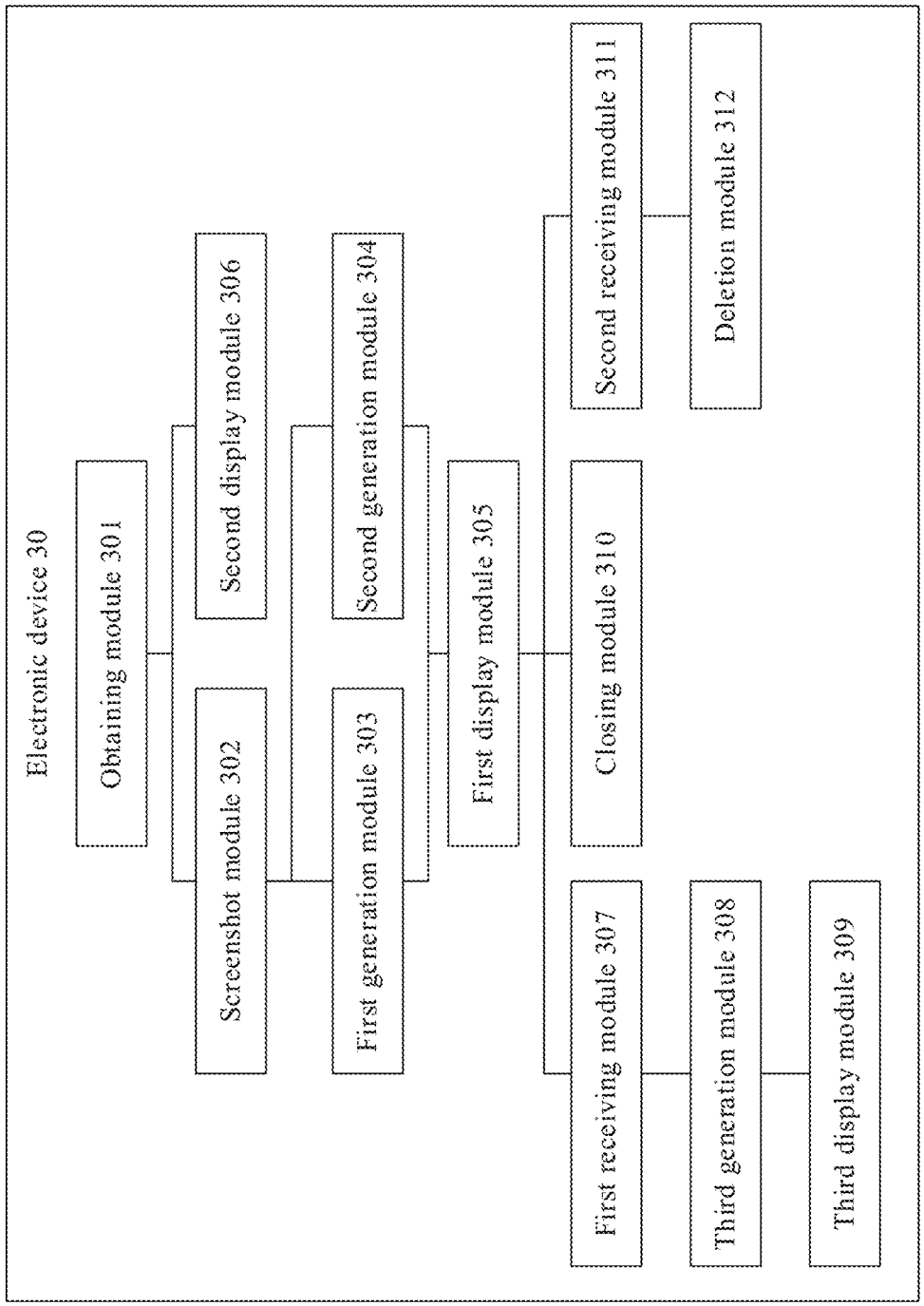
FIG. 9 is a structural block diagram of an electronic device according to an embodiment of the present invention.

Referring to FIG. 9, an embodiment of the present invention further provides an electronic device 30, including:

an obtaining module 301, configured to obtain prompt information of a target application, where the target application is in a background running state, and the prompt information includes a window identifier of a target window corresponding to the prompt information;

a screenshot module 302, configured to generate, on a virtual screen, the target window corresponding to the window identifier, and take a screenshot of the target window to obtain a current window screenshot;

a first generation module 303, configured to: in a case that a historical window screenshot of the target window exists and that a difference region exists between the current window screenshot and the historical window screenshot, use the difference region as target display information, where the historical window screenshot is obtained by taking a screenshot of the target window before the target window is switched from a visible state to an invisible state;

a second generation module 304, configured to use the current window screenshot as target display information in a case that no historical window screenshot of the target window exists; and a first display module 305, configured to display the target display information in a target region.

Optionally, the first generation module 303 is further configured to:
in a case that a size of the difference region is the same as a size of the historical window screenshot and that a first prompt mark exists in the difference region, use content of a first preset region in the difference region as the target display information, where the first preset region is a region corresponding to the first prompt mark; or
in a case that a size of the difference region is different from a size of the historical window screenshot and/or that no first prompt mark exists in the difference region, use content of the difference region as the target display information.

Optionally, the second generation module 304 is further configured to:
in a case that a second prompt mark exists in the current window screenshot, use content of a second preset region in the current window screenshot as the target display information, where the second preset region is a region corresponding to the second prompt mark; or
in a case that no second prompt mark exists in the current window screenshot, use content of the current window screenshot as the target display information.

Optionally, the target region includes an icon display region of the target application; and the first display module 305 is further configured to:
display the target display information in the icon display region of the target application.

Optionally, the first display module 305 is further configured to:
in a case that a plurality of pieces of target display information exist, perform differential processing on the plurality of pieces of target display information, and splice the plurality of pieces of target display information after the differential processing, so that the plurality of pieces of target display information are consolidated; and
in the icon display region of the target application, display the consolidated plurality of pieces of target display information in a preset order, where the preset order is related to a target parameter of the target display information.

Optionally, the electronic device 30 further includes:
a second display module 306, configured to display a third prompt mark in the icon display region of the target application in a case that the target application is an encrypted application.

Optionally, the first display module 305 is further configured to:
dynamically display the target display information in the icon display region of the target application.

Optionally, the electronic device 30 further includes:
a first receiving module 307, configured to receive a first input by a user;
a third generation module 308, configured to generate a floating window of target transparency in response to the first input; and
a third display module 309, configured to display the target display information by using the floating window, where a display region of the floating window is larger than the icon display region of the target application.

Optionally, the electronic device 30 further includes:
a closing module 310, configured to close the floating window under a preset condition, where the preset condition includes at least one of the following:
no second input by the user to the floating window is detected in a preset display time period;
a third input by the user to the floating window is detected; and
a fourth input by the user to a display region other than the display region of the floating window on a physical screen is detected.

Optionally, the electronic device 30 further includes:
a second receiving module 311, configured to receive a fifth input by a user; and
a deletion module 312, configured to delete the target display information in response to the fifth input.

The electronic device 30 provided in this embodiment of the present invention is capable of implementing various processes implemented by the electronic device in the method embodiments in FIG. 1 to FIG. 8. To avoid repetition, details are not described herein again.

According to the electronic device provided in this embodiment of the present invention, the target window of the target application corresponding to the received prompt information is opened by using the virtual screen, and the screenshot is taken; and content of the target window is displayed in the target region to the user based on a comparison between the current window screenshot and the historical window screenshot of the target window. Therefore, the user can quickly and comprehensively view the content corresponding to the prompt information without spending a lot of time starting the target window of the target application, and user experience is improved.

Figure 10:
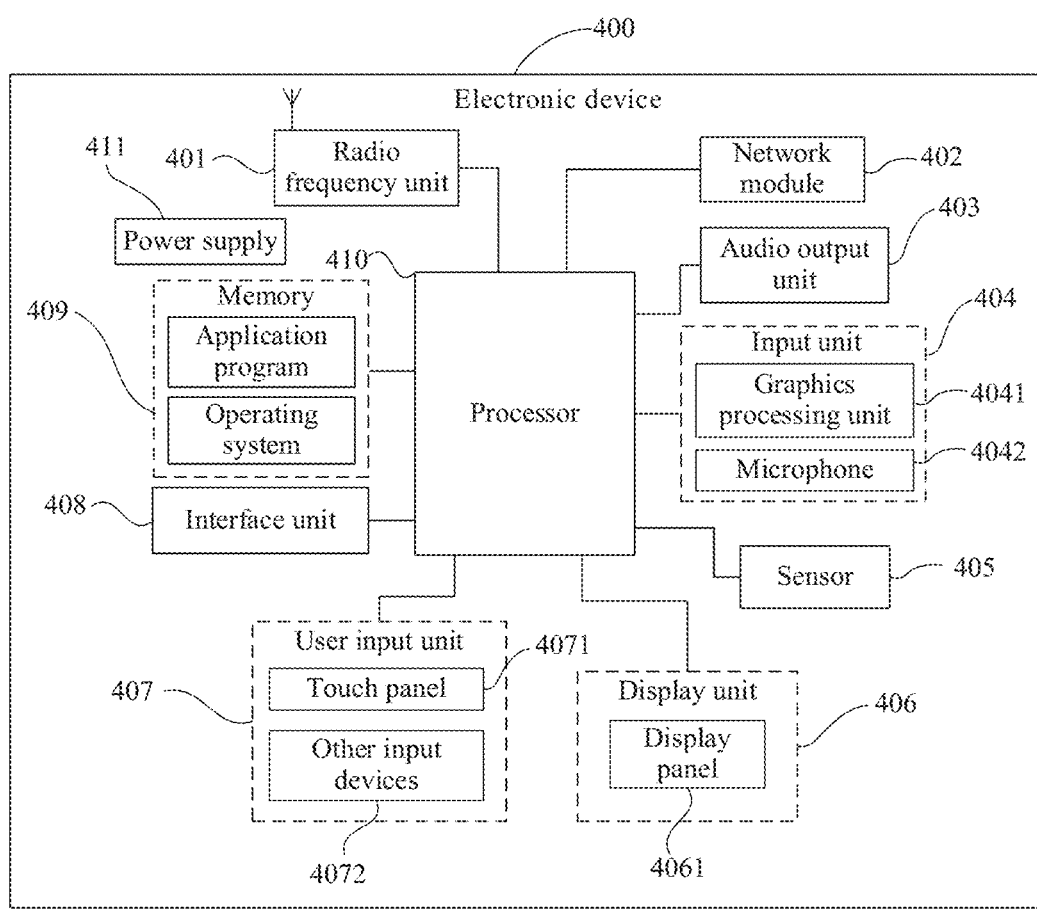
FIG. 10 is a schematic diagram of a hardware structure of an electronic device according to an embodiment of the present invention.

FIG. 10 is a schematic diagram of a hardware structure of an electronic device for implementing each embodiment of the present invention.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the electronic device shown in FIG. 10 does not constitute any limitation on the electronic device. The electronic device may include more or fewer components than those shown in the figure, or a combination of some components, or the components disposed differently. In this embodiment of the present invention, the electronic device includes but is not limited to a mobile phone, a tablet computer, a notebook computer, a palmtop computer, a vehicle-mounted terminal, a wearable device, a pedometer, or the like.

The processor 410 is configured to: receive prompt information of a target application, where the target application is in a background running state, and the prompt information includes a window identifier corresponding to the prompt information; generate, on a virtual screen, the target window corresponding to the window identifier, and take a screenshot of the target window to obtain a current window screenshot; in a case that a historical window screenshot of the target window exists and that a difference region exists between the current window screenshot and the historical window screenshot, obtain target display information from the difference region, where the historical window screenshot is obtained by taking a screenshot of the target window before the target window is switched from a visible state to an invisible state; in a case that no historical window screenshot of the target window exists, obtain target display information based on the current window screenshot; and display the target display information in an icon display region of the target application.

In this embodiment of the present invention, the target window of the target application corresponding to the received prompt information is opened by using the virtual screen, and the screenshot is taken; and content of the target window is displayed in the target region to a user based on a comparison between the current window screenshot and the historical window screenshot of the target window. Therefore, the user can quickly and comprehensively view the content corresponding to the prompt information without spending a lot of time starting the target window of the target application, and user experience is improved.

It should be understood that in this embodiment of the present invention, the radio frequency unit 401 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may also communicate with a network and other devices via a wireless communications system.

The electronic device provides the user with wireless broadband Internet access through the network module 402, for example, helping the user send and receive e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal received sound or a message received sound) related to a specific function performed by the electronic device 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a still picture or video obtained by an image capture apparatus (such as a camera) in a video capture mode or an image capture mode. A processed image frame may be displayed on the display unit 406. The image frame processed by the graphics processing unit 4041 may be stored in the memory 409 (or another storage medium) or be sent by the radio frequency unit 401 or the network module 402. The microphone 4042 is capable of receiving sounds and processing such sounds into audio data. The processed audio data can be converted into a format for outputting that can be sent to a mobile communication base station through the radio frequency unit 401 in a telephone call mode.

The electronic device 400 further includes at least one sensor 405, for example, an optical sensor, a motion sensor, and other sensors. Specifically, the optical sensor includes an ambient light sensor and a proximity sensor. The ambient light sensor may adjust luminance of the display panel 4061 based on brightness of ambient light, and the proximity sensor may turn off the display panel 4061 and/or backlight when the electronic device 400 moves close to an ear. As a type of motion sensor, an accelerometer sensor can detect magnitudes of accelerations in all directions (usually three axes), can detect a magnitude and a direction of gravity when the electronic device is in a stationary state, and can be applied to electronic device posture recognition (such as screen switching between portrait and landscape, related games, and magnetometer posture calibration), functions related to vibration recognition (such as pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided to the user. The display unit 606 may include the display panel 4061, and the display panel 4061 may be configured in a form of a liquid crystal display (LCD), an organic light-emitting diode (OLED), or the like.

The user input unit 407 may be configured to receive input digit or character information and generate a key signal input related to user setting and function control of the electronic device. Specifically, the user input unit 407 includes a touch panel 4071 and other input devices 4072. The touch panel 4071 is also referred to as a touchscreen and can collect a touch operation (such as an operation performed by the user on the touch panel 4071 or near the touch panel 4071 with a finger or by using any proper object or accessory such as a stylus) of the user on or near the touch panel 4071. The touch panel 4071 may include two parts: a touch detection apparatus and a touch controller. The touch detection apparatus detects a touch azimuth of the user, detects a signal brought by a touch operation, and transmits the signal to the touch controller. The touch controller receives touch information from the touch detection apparatus, converts the touch information into touchpoint coordinates, and sends the touchpoint coordinates to the processor 410, and receives a command sent by the processor 410 and executes the command. In addition, the touch panel 4071 may be implemented in a plurality of forms, for example, as a resistive, capacitive, infrared, or surface acoustic wave touch panel. The user input unit 407 may further include other input devices 4072 in addition to the touch panel 4071. Specifically, the other input devices 4072 may include but are not limited to a physical keyboard, a function key (such as a volume control key or a switch key), a trackball, a mouse, and a joystick. Details are not described herein.

Further, the touch panel 4071 may cover the display panel 4061. When detecting a touch operation on or near the touch panel 4071, the touch panel 4071 transmits the touch operation to the processor 410 to determine a type of a touch event. Then, the processor 410 provides a corresponding visual output on the display panel 4061 based on the type of the touch event. Although in FIG. 10, the touch panel 4071 and the display panel 4061 act as two independent parts to implement input and output functions of the electronic device, in some embodiments, the touch panel 4071 and the display panel 4061 may be integrated to implement the input and output functions of the electronic device. This is not specifically limited herein.

The interface unit 408 is an interface for connecting the electronic device 400 to an external apparatus. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 408 may be configured to receive an input (for example, data information or power) from an external apparatus and transmit the received input to one or more elements within the electronic device 400, or may be configured to transmit data between the electronic device 400 and the external apparatus.

The memory 409 may be configured to store software programs and various data. The memory 409 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 409 may include a high-speed random access memory, and may further include a non-volatile memory such as at least one disk storage device, a flash memory device, or another volatile solid-state storage device.

The processor 410 is a control center of the electronic device, uses various interfaces and lines to connect all parts of the entire electronic device, and executes various functions and processing data of the electronic device by running or executing software programs and/or modules stored in the memory 409 and invoking data stored in the memory 409, so as to perform overall monitoring on the electronic device. The processor 410 may include one or more processing units. Optionally, an application processor and a modem processor may be integrated in the processor 410. The application processor primarily processes an operating system, user interfaces, applications, and the like. The modem processor primarily processes radio communication. It may be understood that the modem processor may alternatively not be integrated in the processor 410.

The electronic device 400 may further include the power supply 411 (such as a battery) for supplying power to the components. Optionally, the power supply 411 may be logically connected to the processor 410 through a power management system. In this way, functions such as charge management, discharge management, and power consumption management are implemented by using the power management system.

In addition, the electronic device 400 includes some functional modules that are not shown. Details are not described herein.

Optionally, an embodiment of the present invention further provides an electronic device, including a processor 410, a memory 409, and a computer program stored in the memory 409 and capable of running on the processor 410. When the computer program is executed by the processor 410, each process of the foregoing information display method embodiment is implemented, with the same technical effect achieved. To avoid repetition, details are not described herein again.

An embodiment of the present invention further provides a computer-readable storage medium, where a computer program is stored in the computer-readable storage medium. When the computer program is executed by a processor, each process of the foregoing information display method embodiment is implemented, with the same technical effect achieved. To avoid repetition, details are not described herein again. The computer-readable storage medium is, for example, a read-only memory (ROM for short), a random access memory (RAM for short), a magnetic disk, or an optical disc.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A non-transitory computer readable storage medium storing instructions thereon that, when executed by a processor, cause the processor to execute a method, the method comprising:
    obtaining prompt information of a target application, wherein the target application is in a background running state, and the prompt information comprises a window identifier of a target window corresponding to the prompt information;
    generating, on a virtual screen, the target window corresponding to the window identifier, and taking a screenshot of the target window to obtain a current window screenshot;
    in a case that a historical window screenshot of the target window exists and that a difference region exists between the current window screenshot and the historical window screenshot, using the difference region as target display information, wherein the historical window screenshot is obtained by taking a screenshot of the target window before the target window is switched from a visible state to an invisible state;
    in a case that no historical window screenshot of the target window exists, using the current window screenshot as target display information; and
    displaying the target display information in a target region.

2. The non-transitory computer readable storage medium according to claim 1, wherein the step of using the difference region as target display information comprises:
    in a case that a size of the difference region is the same as a size of the historical window screenshot and that a first prompt mark exists in the difference region, using content of a first preset region in the difference region as the target display information, wherein the first preset region is a region corresponding to the first prompt mark; or in a case that a size of the difference region is different from a size of the historical window screenshot and/or that no first prompt mark exists in the difference region, using content of the difference region as the target display information.

3. The non-transitory computer readable storage medium according to claim 1, wherein the step of using the current window screenshot as target display information comprises:

in a case that a second prompt mark exists in the current window screenshot, using content of a second preset region in the current window screenshot as the target display information, wherein the second preset region is a region corresponding to the second prompt mark; or in a case that no second prompt mark exists in the current window screenshot, using content of the current window screenshot as the target display information.

4. The non-transitory computer readable storage medium according to claim 1, wherein the target region comprises an icon display region of the target application, and the step of displaying the target display information in a target region comprises:

displaying the target display information in the icon display region of the target application.

5. The non-transitory computer readable storage medium according to claim 4, wherein the step of displaying the target display information in the icon display region of the target application comprises:

in a case that a plurality of pieces of target display information exist, performing differential processing on the plurality of pieces of target display information, and splicing the plurality of pieces of target display information after the differential processing, so that the plurality of pieces of target display information are consolidated; and in the icon display region of the target application, displaying the consolidated plurality of pieces of target display information in a preset order, wherein the preset order is related to a target parameter of the target display information.

6. The non-transitory computer readable storage medium according to claim 4, wherein after the step of obtaining prompt information of a target application, the method further comprises:

in a case that the target application is an encrypted application, displaying a third prompt mark in the icon display region of the target application.

7. The non-transitory computer readable storage medium according to claim 4, wherein the step of displaying the target display information in the icon display region of the target application comprises:

dynamically displaying the target display information in the icon display region of the target application.

8. The non-transitory computer readable storage medium according to claim 4, wherein after the step of displaying the target display information in the icon display region of the target application, the method further comprises:

receiving a first input by a user;

generating a floating window of target transparency in response to the first input; and displaying the target display information by using the floating window, wherein a display region of the floating window is larger than the icon display region of the target application.

9. The non-transitory computer readable storage medium according to claim 8, wherein after the step of displaying the target display information by using the floating window, the method further comprises:

closing the floating window under a preset condition, wherein the preset condition comprises at least one of the following:

no second input by the user to the floating window is detected in a preset display time period;

a third input by the user to the floating window is detected; and a fourth input by the user to a display region other than the display region of the floating window on a physical screen is detected.

10. The non-transitory computer readable storage medium according to claim 1, wherein after the step of displaying the target display information in a target region, the method further comprises:

receiving a fifth input by a user; and deleting the target display information in response to the fifth input.

11. An electronic device, comprising a processor, a memory, and a computer program stored in the memory and capable of running on the processor, the processor executes the computer program to perform:

obtain prompt information of a target application, wherein the target application is in a background running state, and the prompt information comprises a window identifier of a target window corresponding to the prompt information;

generate, on a virtual screen, the target window corresponding to the window identifier, and take a screenshot of the target window to obtain a current window screenshot;

in a case that a historical window screenshot of the target window exists and that a difference region exists between the current window screenshot and the historical window screenshot, use the difference region as target display information, wherein the historical window screenshot is obtained by taking a screenshot of the target window before the target window is switched from a visible state to an invisible state;

use the current window screenshot as target display information in a case that no historical window screenshot of the target window exists; and display the target display information in a target region.

12. The electronic device according to claim 11, wherein the processor executes the computer program to perform: in a case that a size of the difference region is the same as a size of the historical window screenshot and that a first prompt mark exists in the difference region, use content of a first preset region in the difference region as the target display information, wherein the first preset region is a region corresponding to the first prompt mark; or in a case that a size of the difference region is different from a size of the historical window screenshot and/or that no first prompt mark exists in the difference region, use content of the difference region as the target display information.

13. The electronic device according to claim 11, wherein the processor executes the computer program to perform: in a case that a second prompt mark exists in the current window screenshot, use content of a second preset region in the current window screenshot as the target display information, wherein the second preset region is a region corresponding to the second prompt mark; or in a case that no second prompt mark exists in the current window screenshot, use content of the current window screenshot as the target display information.

14. The electronic device according to claim 11, wherein the target region comprises an icon display region of the target application; and the processor executes the computer program to perform: display the target display information in the icon display region of the target application.

15. The electronic device according to claim 14, wherein the processor executes the computer program to perform: in a case that a plurality of pieces of target display information exist, perform differential processing on the plurality of pieces of target display information, and splice the plurality of pieces of target display information after the differential processing, so that the plurality of pieces of target display information are consolidated; and in the icon display region of the target application, display the consolidated plurality of pieces of target display information in a preset order, wherein the preset order is related to a target parameter of the target display information.

16. The electronic device according to claim 14, wherein the processor executes the computer program to perform: display a third prompt mark in the icon display region of the target application in a case that the target application is an encrypted application.

17. The electronic device according to claim 14, wherein the processor executes the computer program to perform: dynamically display the target display information in the icon display region of the target application.

18. The electronic device according to claim 14, wherein the processor executes the computer program to perform: receive a first input by a user;

generate a floating window of target transparency in response to the first input; and display the target display information by using the floating window, wherein a display region of the floating window is larger than the icon display region of the target application.

19. The electronic device according to claim 18, wherein the processor executes the computer program to perform: close the floating window under a preset condition, wherein the preset condition comprises at least one of the following:

no second input by the user to the floating window is detected in a preset display time period;

a third input by the user to the floating window is detected; and a fourth input by the user to a display region other than the display region of the floating window on a physical screen is detected.

20. The electronic device according to claim 11, wherein the processor executes the computer program to perform: receive a fifth input by a user; and delete the target display information in response to the fifth input.

* * * * *